United States Patent [19]

Lutz et al.

[11] 4,131,562

[45] Dec. 26, 1978

[54] STABILIZED PARTICULATE PEROXYGEN COMPOUNDS

[75] Inventors: Charles W. Lutz, Princeton; Leon E. Cohen, Somerset, both of N.J.

[73] Assignee: FMC Corporation, Philadelphia, Pa.

[21] Appl. No.: 807,629

[22] Filed: Jun. 17, 1977

[51] Int. Cl.$^2$ .................. C01B 15/10; C11D 3/39; C11D 7/18; C11D 7/54
[52] U.S. Cl. ............................... 252/186; 8/111; 252/95; 252/99; 423/274; 423/415 P; 427/220; 427/221
[58] Field of Search ............ 252/186, 95, 99; 8/107, 8/111; 423/274, 277, 415 P; 427/220, 221

[56] References Cited

U.S. PATENT DOCUMENTS

| 3,932,295 | 1/1976 | Fujino | 252/99 |
|---|---|---|---|
| 3,979,318 | 9/1976 | Tokiwa et al. | 252/186 |
| 3,984,342 | 10/1976 | Hull et al. | 252/186 |
| 3,992,317 | 11/1976 | Brichard et al. | 427/221 |

*Primary Examiner*—Benjamin R. Padgett
*Assistant Examiner*—Irwin Gluck
*Attorney, Agent, or Firm*—Christopher Egolf

[57] ABSTRACT

A particulate peroxygen compound having improved storage stability against loss of its active oxygen, the peroxygen compound being coated with 0.1 to 3.0 weight percent of an ethylene oxide-derivative stabilizing material.

4 Claims, No Drawings

STABILIZED PARTICULATE PEROXYGEN COMPOUNDS

This invention relates to the preparation of stabilized particulate peroxygen compounds, particularly sodium carbonate peroxide, sodium perborate and mixtures thereof.

Peroxygen compounds have been used commercially as a source of active oxygen in bleaching, detergent, cleaning, rinsing, and scouring formulations. Their effectiveness is believed to result from an oxidative process which decolorizes or removes impurities or foreign matter from the material being treated. Two peroxygen compounds that have been used as a source of active oxygen in these formulations are sodium carbonate peroxide and sodium perborate.

Sodium carbonate peroxide and sodium perborate are crystalline peroxygen compounds having the respective formulas $2Na_2CO_3 \cdot 3H_2O_2$ (theoretical active oxygen content of 15.28% by weight), and $NaBO_3 \cdot 4H_2O$ (theoretical active oxygen content of 10.38% by weight), which compounds are capable of releasing hydrogen peroxide in aqueous solutions. It is well known that sodium carbonate peroxide may be prepared by reacting hydrogen peroxide with sodium carbonate alone or in the presence of a stabilizer either in batch or continuous processes. In contrast, sodium perborate has been prepared by reacting borax or boric acid with sodium hydroxide and hydrogen peroxide. Unfortunately, the known methods for preparing sodium carbonate peroxide and sodium perborate do not provide a compound which is completely storage stable, that is, a compound which does not decompose and lose its active oxygen upon storage.

Because the decomposition rate of sodium carbonate peroxide is substantially faster than that for sodium perborate, sodium carbonate peroxide has not found complete commercial acceptance even though it has a higher initial active oxygen content than sodium perborate.

Numerous stabilizing agents have been proposed to minimize the peroxygen decomposition rate, which stabilizers have been employed in two primary ways. The first involves preparing the peroxygen compound in the presence of a stabilizer. United States Patent 3,860,694 discloses a process for stabilizing sodium carbonate peroxide by preparing sodium carbonate peroxide in the presence of a stabilizer selected from the group consisting of magnesium sulfate, magnesium silicate, magnesium chloride, magnesium fluorosilicate, magnesium oxide, and magnesium hydroxide, ethylene diaminetetraacetic acid, ethylene triaminepentaacetic acid and benzoic acid. U.S. Pat. 3,677,697 discloses preparing sodium carbonate peroxide in the presence of inorganic stabilizers and 1 to 3% by weight benzoic acid.

The second approach involves stabilizing a previously prepared peroxygen compound by either treating solutions containing the peroxygen or by coating the peroxygen with a stabilizer. U.S. Pat. 3,766,078 discloses stabilizing aqueous solutions of peroxygen compounds containing an alkali metal silicate with a synergistic stabilizing agent comprising nitrilotriacetic acid, 1-dihydroxyethylidene-1,1-diphosphonic acid and a water-soluble magnesium or calcium salt. British Patent 1,398,876 discloses coating a solid peroxygen with the condensation product of at least one long chain fatty acid and a poly(alkylene glycol) or a poly(alkylene glycol) terminally substituted by one or two amine groups.

Even though all of the aforementioned processes have been effective in partially increasing the storage stability of peroxygen compounds, more effective stabilizers are necessary to increase the stability of peroxygen compounds to higher levels.

Applicants have unexpectedly discovered that the storage stability of a particulate peroxygen compound is significantly improved by coating the particulate peroxygen compound with specific ethylene oxide-derivative stabilizing materials. More particularly, Applicants have discovered that a particulate peroxygen compound selected from the group consisting of sodium carbonate peroxide, sodium perborate and mixtures thereof has improved storage stability when coated with about 0.1 to about 3.0 weight percent of a stabilizing material selected from the group consisting of certain polyethoxy alcohols, polyethoxy thioethers, polyethoxy phosphoric acid esters, polyethoxy fatty acid tertiary amines and quaternary ammonium salts thereof, ethoxy propoxy block copolymeric alcohols, alkylphenoxy alcohols, α-phenoxy-α-benzyl polyethoxy alcohols and diisobutylphenoxyethoxyethyl dimethylbenzyl ammonium chloride monohydrate.

According to the invention, a particulate peroxygen compound chosen from sodium carbonate peroxide, sodium perborate and mixtures thereof, is coated with a specific ethylene oxide-derived stabilizing material. The peroxygen compounds are prepared by conventional processes, which processes do not constitute a part of this invention.

The peroxygen compounds being coated should be substantially dry, that is, they should have from 0 to 0.2% by weight residual moisture. Moisture contents up to 10% may be tolerated during the coating procedure if excess moisture above 1.0% is removed by drying the coated product prior to storage. These small amounts of moisture may be tolerated without subsequent decomposition of the peroxygen compounds.

Mixtures of sodium carbonate peroxide and sodium perborate may be prepared by conventional techniques. Such mixtures may be employed in weight ratios of 1:99 to 99:1 respectively and are preferably employed in weight ratios of between 1:1 to 1:2 sodium carbonate peroxide to sodium perborate.

The peroxygen compound is preferably coated with about 0.1 to about 3.0 weight percent of the ethylene oxide-derived stabilizing material and most preferably with about 0.5 to about 2.0 weight percent. Amounts substantially less than 0.1 weight percent are not efficient in stabilizing the peroxygen compounds, and amounts greater than 3.0 weight percent may result in caking of the peroxygen compounds.

The ethylene oxide-derived stabilizing material may be applied to the peroxygen compound by conventional techniques. One method involves pouring or spraying the stabilizing material onto a bed of the peroxygen compound while it is mechanically agitated. Alternatively, the stabilizing material may be sprayed onto peroxygen compound as it is being agitated in a fluidized bed, which bed may be heated or unheated. Alternatively, the stabilizing material may be dissolved in a solvent, inert to the peroxygen compound being coated and preferably having low volatility, and sprayed onto the peroxygen compound particles agitated in a fluidized bed, the bed being supplied with sufficient hot air to evaporate the solvent. Suitable solvents include water, alcohol, dimethyl formamide, tetrahydrofuran and the like.

The stabilizing materials employed in this invention are selected from the group consisting of:

(a) polyethoxy alcohols having the general formula:

$$RO(CH_2CH_2O)_nH$$

wherein n is an integer of from 4 to 25 and R is selected from primary and secondary linear alkyl and alkenyl radicals having from 10 to 18 carbon atoms and alkylphenyl radicals in which the alkyl moiety is linear, having from 8 to 18 carbon atoms;

(b) polyethoxy thioethers having the general formula:

$$RS(CH_2CH_2O)_nH$$

wherein n is an integer of from 4 to 20, and R is a linear alkyl or alkenyl radical having from 10 to 18 carbon atoms;

(c) polyethoxy phosphoric acid esters having the general formula:

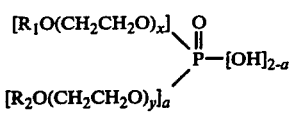

wherein a is either 0 or 1; and for a=1, x and y are the same or different integers of from 2 to 10, and $R_1$ and $R_2$ are the same or different and are selected from linear alkyl radicals having from 8 to 18 carbon atoms and alkylphenyl radicals in which the alkyl moiety is linear, having from 8 to 18 carbon atoms; and for a=0, x is an integer of from 4 to 20 and $R_1$ is selected from linear alkyl radicals having from 8 to 18 carbon atoms and alkylphenyl radicals in which the alkyl moiety is linear, having from 8 to 18 carbon atoms;

(d) polyethoxy fatty acid tertiary amines and quaternary ammonium salts thereof wherein the tertiary amines have the general formula:

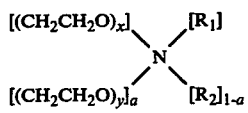

wherein a is either 0 or 1; and for a=1, x and y are the same or different integers of from 1 to 30, and $R_1$ is a linear alkyl or alkenyl radical having from 10 to 18 carbon atoms; and for a=0, x is an integer of from 1 to 60 and $R_1$ and $R_2$ are the same or different linear alkyl or alkenyl radicals having from 10 to 18 carbon atoms.

(e) ethoxy propoxy block copolymeric alcohols having the general formula:

$$RO(CH(CH_3)CH_2O)_m(CH_2CH_2O)_nH$$

wherein m and n are the same or different integers of from 4 to 100 such that the weight percent of the ethylene oxide exceeds 20%, up to about 80%, of the molecular weight and R is $HOCH(CH_3)CH_2-$ or $HOCH_2CH_2-$.

(f) alkylphenoxy polyethoxy alcohols having the general formula:

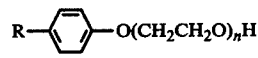

wherein n is an integer of from 8 to 40 and R is a branched alkyl radical containing from 8 to 9 carbon atoms;

(g) α-phenoxy-α-benzylpolyethoxy alcohols having the general formula:

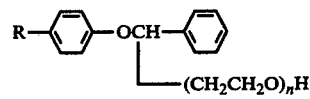

wherein n is an integer of from 8 to 40 and R is a branched alkyl radical containing from 8 to 9 carbon atoms; and (h) diisobutylphenoxyethoxyethyl dimethylbenzyl ammonium chloride monohydrate having the general formula:

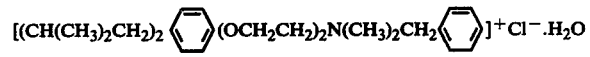

The stabilizing materials that are coated onto the particulate peroxygen compounds in this invention are preferably liquid or solids having relatively low melting points, up to 40° C. Solid stabilizing materials having melting points above 40° C. may be utilized by first dissolving the solid into a solvent that is relatively inert with respect to the peroxygen compound, coating the particulate peroxygen compound and evaporating the solvent to leave a residue of the stabilizing material coated on the peroxygen compound.

Preferred polyethoxy alcohols are those having the general formula:

$$RO(CH_2CH_2O)_nH$$

wherein n is an integer from 6 to 20 and R is selected from primary and secondary alkyl and alkenyl radicals having from 11 to 15 carbon atoms and alkylphenyl radicals in which the alkyl moiety is linear, having from 8 to 18 carbon atoms. Such preferred polyethoxy alcohols are commercially available as Neodol 45-11 and 23-6.5 (trademark of Shell Chemical Co.), Tergitol 15-S-9 (trademark of Union Carbide Corp.), Plurafac B26 (trademark of BASF Corp.) and Igepal CO530 (trademark of GAF Corp.).

Preferred polyethoxy thioethers are ones having the general formula:

$$RS(CH_2CH_2O)_nH$$

wherein n is an integer of from 6 to 10 and R is a linear alkyl or alkenyl radical having about 12 carbon atoms, such as Siponic SK (trademark of Alcolac Chemical Corp.).

Preferred polyethoxy phosphoric acid esters are those having the general formula:

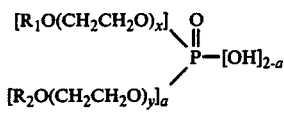

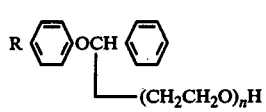

wherein a is either 0 or 1; and for a=1, x and y are the same or different integers of from 4 to 8, most preferably 6, and $R_1$ and $R_2$ are the same or different and are selected from linear alkyl radicals having from 11 to 16 carbon atoms and alkylphenyl radicals in which the alkyl moiety is linear, having from 8 to 12 carbon atoms, most preferably 9 carbon atoms; and for a=0, x is an integer of from 9 to 16, most preferably 12, and $R_1$ is selected from linear alkyl radicals having from 11 to 16 carbon atoms and alkylphenyl radicals in which the alkyl moiety is linear, having from 8 to 12 carbon atoms, most preferably 9 carbon atoms. These preferred polyethoxy phosphoric acid esters are commercially available from GAF Corp. under the trademark Gafac, such as Gafac PE510.

Preferred polyethoxy fatty acid tertiary amines and quaternary ammonium salts thereof are compounds having the general formula (for the tertiary amines):

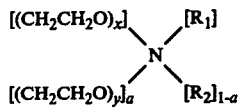

wherein a is 1, x and y are the same or different integers of from 1 to 25 and $R_1$ is a linear alkyl or alkenyl radical having from 14 to 18 carbon atoms. Preferably the total number of ethylene oxide units per molecule is fewer than 75 units. The preferred polyethoxy fatty acid amines are available commercially from Armak Co. under the trademark Ethomeen, such as Ethomeen C25, 18/12, 18/15, 18/20, and 18/60. The quaternary ammonium salts, obtained by the reaction of methyl chloride to the amine, are available from Armak Co. under the trademark Ethoquad, such as Ethoquad C25 and 18/25.

Ethoxy propoxy block copolymeric alcohols, having the general formula:

$$RO(CH(CH_3)CH_2O)_m(CH_2CH_2O)_nH$$

wherein m and n are the same or different integers of from 4 to 100 such that the weight percent of the ethylene oxide exceeds 20%, up to about 80%, of the molecular weight and R is $HOCH(CH_3)CH_2-$ or $HOCH_2CH_2-$, are commercially available from BASF Corp. under the trademark Pluronic, such as Pluronic 10R8, 25R5, F38, L35, L43 and L64.

Preferred alkylphenoxy polyethoxy alcohols are those having the general formula:

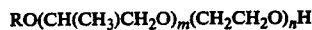

wherein n is an integer of from 8 to 10 and R is a branched alkyl radical containing from 8 to 9 carbon atoms. Such an alkylphenoxy polyethoxy alcohol is available commercially from Rohm & Haas Co. under the trademark Triton X-100.

Preferred α-phenoxy-α-benzylpolyethoxy alcohols are ones having the general formula:

wherein n is an integer of from 8 to 10 and R is a branched alkyl radical containing from 8 to 9 carbon atoms. Such an α-phenoxy-α-benzylpolyethoxy alcohol is available commercially from Rohm & Haas Co. under the trademark Triton CF10.

Diisobutylphenoxyethoxyethyl dimethylbenzyl ammonium chloride monohydrate having the general formula:

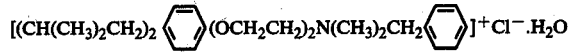

is available commercially from Rohm & Haas Co. under the trademark Hyamine 1622.

The stabilized peroxygen compounds prepared according to the invention retain at least 75% of their original active oxygen content after five days when subjected to a temperature of 120° F. and 90% relative humidity. This high storage stability may make it possible to ship and store the stabilized peroxygen material in bulk, which heretofore has been unsuccessful and renders the peroxygen compounds more acceptable as a formulation component.

The following examples are given to illustrate the invention. All percentages given are based upon weight unless otherwise indicated.

EXAMPLE 1

Inventive Runs 1 to 8

Comparative Run A

A conventionally prepared dry sodium carbonate peroxide product was coated with various additives by adding 0.1 gram of the stabilizing material to 10 grams of the sodium carbonate peroxide in a 250 ml beaker. The mixture was stirred manually until the particles were uniformly coated with the 1% in weight stabilizing material, whereupon the active oxygen content of the coated product was then analyzed.

As is noted in Table I, Runs 1A to 1E employed various polyethoxy alcohols as the stabilizing material coated onto the sodium carbonate peroxide particles. Run 2 illustrates the use of a polyethoxy thioether as the stabilizing material and Run 3, a polyethoxy phosphoric acid ester. Runs 4A to 4G illustrate several polyethoxy fatty acid tertiary amines and their quaternary ammonium salts as the stabilizing material. Runs 5A to 5F employed various ethoxypropoxy block copolymeric alcohols as the stabilizing material. Runs 6, 7 and 8 employed an alkylphenoxy polyethoxy alcohol, an α-phenoxy-α-benzylpoly- ethoxy alcohol and diisobutylphenoxyethoxyethyl dimethylbenzyl ammonium chloride monohydrate as the stabilizing agents, respectively. Comparative Run A illustrates the stability of sodium carbonate peroxide particles which were not coated with a stabilizing material.

Storage stability of the peroxygen compound was measured by placing 1 gram of the coated material in a 250 ml Erlenmeyer flask covered with a water vapor-permeable membrane (kraft paper coated with polyethylene). The sample was then placed in a cabinet maintained at a temperature of 120° F. and at 90% relative humidity for five days whereupon the material was again analyzed for active oxygen content. Results are set forth in Table I.

EXAMPLE 2

Inventive Runs 9A to 9D

Comparative Run B

The procedure of Example 1 was repeated except that a polyethoxy fatty acid tertiary amine, Ethomeen C/25, was employed as the stabilizing material in varying concentrations between 0.1 to 1.0% with sodium carbonate peroxide and sodium perborate tetrahydrate as the peroxygen compound. The results are set forth in Table II and indicate that the best stability was obtained at the highest level of stabilizer employed, namely a 1.0% by weight. coating on the particles.

Comparative Run B illustrates the stability of sodium carbonate peroxide and sodium perborate with no stabilizing material coated thereon.

EXAMPLE 3

Inventive Runs 10A and 10B

Comparative Run C

The procedure of Example 1 was repeated except that the ethylene oxide-derived stabilizing material was added to a peroxygen compound mixture containing six grams sodium perborate tetrahydrate and four grams sodium carbonate peroxide. Run 10A employed a polyethoxy alcohol, Neodol TM 23-6.5, and Run 10B employed a polyethoxy fatty acid tertiary amine, Ethomeen TM C/25. As evidenced by the results presented in Table III, a mixture of sodium carbonate peroxide and sodium perborate tetrahydrate coated with an ethylene oxide-derived stabilizing material (Runs 10A and 10B) possesses good stability against loss of its active oxygen as measured by A.O. content after the five day stability test. Run C, in which the peroxygen compound mixture was not coated with a stabilizing material, provides a basis for comparison in Table II.

TABLE 1

| Run No. | Coating Agent | Initial Active Oxygen Content,% | Final Active Oxygen Content,% | Percent of Initial Active Oxygen Remaining |
|---|---|---|---|---|
| Comparative Run A | None | 13.54 | 8.12 | 60% |
| Inventive |  |  |  |  |
| Run 1A | Neodol® 23-6.5 | 13.40 | 11.11 | 83% |
| Run 1B | Neodol® 45-11 | 13.40 | 11.12 | 83% |
| Run 1C | Tergitol® 15-S-9 | 13.40 | 10.99 | 82% |
| Run 1D | Plurafac® B-26 | 13.40 | 11.26 | 84% |
| Run 1E | Igepal® C0530 | 13.40 | 11.00 | 82% |
| Run 2 | Siponic® SK | 13.40 | 10.74 | 80% |
| Run 3 | Gafac® PE 510 | 13.40 | 11.02 | 82% |
| Run 4A | Ethomeen® C/25 | 13.40 | 10.87 | 81% |
| Run 4B | Ethomeen® 18/12 | 13.40 | 10.72 | 80% |
| Run 4C | Ethomeen® 18/15 | 13.40 | 10.74 | 80% |
| Run 4D | Ethomeen® 18/20 | 13.40 | 10.69 | 80% |
| Run 4E | Ethomeen® 18/60 | 13.40 | 10.85 | 81% |
| Run 4F | Ethoquad® C/25 | 13.40 | 10.83 | 81% |
| Run 4G | Ethoquad® 18/25 | 13.40 | 10.87 | 81% |
| Run 5A | Pluronic® 10R8 | 12.73 | 10.72 | 84% |
| Run 5B | Pluronic® 25R5 | 12.73 | 10.53 | 83% |
| Run 5C | Pluronic® F38 | 13.40 | 10.15 | 76% |
| Run 5D | Pluronic® L35 | 12.73 | 10.07 | 78% |
| Run 5E | Pluronic® L43 | 12.73 | 9.83 | 77% |
| Run 5F | Pluronic® L64 | 13.40 | 10.49 | 78% |
| Run 6 | Triton® X-100 | 13.40 | 11.00 | 82% |
| Run 7 | Triton® CF10 | 13.40 | 10.20 | 76% |
| Run 8 | Hyamine® 1622 | 13.40 | 10.51 | 78% |

TABLE II

| Run # | Ethomeen C/25 Stabilizer Concentration | Sodium Perborate Tetrahydrate | | | Sodium Carbonate Peroxide | | |
|---|---|---|---|---|---|---|---|
| | | Initial A.O.* Content,% | Final A.O.* Content,% | Percent of Initial A.O.* Remaining | Initial A.O.* Content,% | Final A.O.* Content,% | Percent of Initial A.O.* Remaining |
| Comparative Run B | 0 | 10.19 | 6.46 | 63% | 13.55 | 8.62 | 64% |
| Inventive |  |  |  |  |  |  |  |
| Run 9A | 0.1 | 10.18 | 7.50 | 74% | 13.54 | 9.51 | 70% |
| Run 9B | 0.25 | 10.16 | 9.00 | 89% | 13.52 | 10.97 | 81% |
| Run 9C | 0.5 | 10.14 | 9.30 | 92% | 13.47 | 11.37 | 84% |
| Run 9D | 1.0 | 10.10 | 9.56 | 95% | 13.41 | 11.77 | 88% |

*Active Oxygen

TABLE III

| Run # | Stabilizing Material | Initial Active Oxygen Content | Final Active Oxygen Content | Percent of Initial A.O.* Remaining |
|---|---|---|---|---|
| Comparative Run C |  | 12.00 | 8.67 | 72% |
| Inventive |  |  |  |  |
| Run 10A | (Neodol® 23-6.5) | 11.88 | 10.76 | 91% |
| Run 10B | (Ethomeen® C/25) | 11.88 | 10.50 | 88% |

*Active Oxygen

We claim:

1. A particulate peroxygen compound selected from the group consisting of sodium carbonate peroxide, sodium perborate and mixtures thereof coated with from about 0.1 to about 3.0 weight percent of an ethylene oxide-derivative stabilizing material selected from the group consisting of:

(a) polyethoxy alcohols having the general formula:

wherein n is an integer of from 4 to 25 and R is selected from primary and secondary linear alkyl and alkenyl radicals having from 10 to 18 carbon atoms and alkylphenyl radicals in which the alkyl moiety is linear, having from 8 to 18 carbon atoms;

(b) polyethoxy thioethers having the general formula:

wherein n is an integer of from 4 to 20, and R is a linear alkyl or alkenyl radical having from 10 to 18 carbon atoms;

(c) polyethoxy phosphoric acid esters having the general formula:

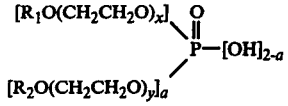

wherein a is either 0 or 1; and for a=1, x and y are the same or different integers of from 2 to 10, and $R_1$ and $R_2$ are the same or different and are selected from linear alkyl radicals having from 8 to 18 carbon atoms and alkylphenyl radicals in which the alkyl moiety is linear, having from 8 to 18 carbon atoms; and for a=0, x is an integer of from 4 to 20 and $R_1$ is selected from linear alkyl radicals having from 8 to 18 carbon atoms and alkylphenyl radicals in which the alkyl moiety is linear, having from 8 to 18 carbon atoms;

(d) polyethoxy fatty acid tertiary amines and quaternary ammonium salts thereof wherein the tertiary amines have the general formula:

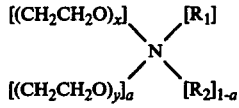

wherein a is either 0 or 1; and for a=1, x and y are the same or different integers of from 1 to 30, and $R_1$ is a linear alkyl or alkenyl radical having from 10 to 18 carbon atoms; and for a=0, x is an integer of from 1 to 60 and $R_1$ and $R_2$ are the same or different linear alkyl or alkenyl radicals having from 10 to 18 carbon atoms;

(e) ethoxy propoxy block copolymeric alcohols having the general formula:

wherein m and n are the same or different integers of from 4 to 100 such that the weight percent of the ethylene oxide exceeds 20%, up to about 80%, of the molecular weight and R is $HOCH(CH_3)CH_2-$ or $HOCH_2CH_2-$;

(f) alkylphenoxy polyethoxy alcohols having the general formula:

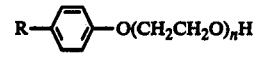

wherein n is an integer of from 8 to 40 and R is a branched alkyl radical containing from 8 to 9 carbon atoms;

(g) α-phenoxy-α-benzylpolyethoxy alcohols having the general formula:

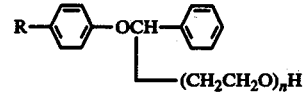

wherein n is an integer of from 8 to 40 and R is a branched alkyl radical containing from 8 to 9 carbon atoms;

(h) diisobutylphenoxyethoxyethyl dimethylbenzyl ammonium chloride monohydrate having the general formula:

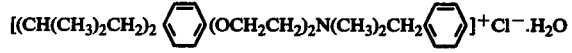

2. The coated particulate peroxygen of claim 1 wherein the peroxygen is coated with 0.5 to 2.0 weight percent of said stabilizing material.

3. The coated particulate peroxygen compound of claim 1 wherein the stabilizing material is selected from the group consisting of:

(a) polyethoxy alcohols having the general formula:

wherein n is an integer of from 6 to 20 and R is selected from primary and secondary linear alkyl and alkenyl radicals having from 11 to 15 carbon atoms and alkylphenyl radicals in which the alkyl moiety is linear, having from 8 to 18 carbon atoms;

(b) polyethoxy thioethers having the general formula:

wherein n is an integer of from 6 to 10, and R is a linear alkyl or alkenyl radical having about 12 carbon atoms;

(c) polyethoxy phosphoric acid esters having the general formula:

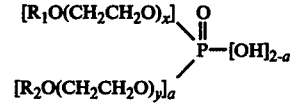

wherein a is either 0 or 1; and for a=1, x and y are the same or different integers of from 4 to 8, and $R_1$ and $R_2$ are the same or different and are selected from linear alkyl radicals having from 11 to 16 carbon atoms and alkylphenyl radicals in which the alkyl moiety is linear, having from 8 to 12 carbon atoms; and for a=0, x is an integer of from 9 to 16 and $R_1$ is selected from linear alkyl radicals having from 11 to 16 carbon atoms and alkylphenyl radicals in which the alkyl moiety is linear, having from 8 to 12 carbon atoms;

(d) polyethoxy fatty acid tertiary amines and quaternary ammonium salts thereof wherein the tertiary amines have the general formula:

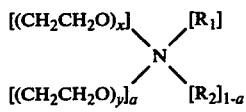

wherein a is 1; x and y are the same or different integers of from 1 to 25, and $R_1$ is a linear alkyl or alkenyl radical having from 14 to 18 carbon atoms;

(e) ethoxy propoxy block copolymeric alcohols having the general formula:

wherein m and n are the same or different integers of from 4 to 100 such that the weight percent of the ethylene oxide exceeds 20%, up to about 80%, of the molecular weight and R is $HOCH(CH_3)CH_2$— or $HOCH_2CH_2$—;

(f) alkylphenoxy polyethoxy alcohols having the general formula:

wherein n is an integer of from 8 to 10 and R is a branched alkyl radical containing from 8 to 9 carbon atoms;

(g) α-phenoxy-α-benzylpolyethoxy alcohols having the general formula:

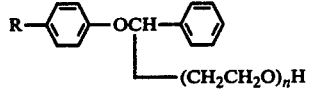

wherein n is an integer of from 8 to 10 and R is a branched alkyl radical containing from 8 to 9 carbon atoms.

4. The coated particulate peroxygen of claim 3 wherein the peroxygen is coated with 0.5 to 2.0 weight percent of said stabilizing material.

* * * * *